(12) United States Patent
Kamiyama et al.

(10) Patent No.: US 9,890,892 B2
(45) Date of Patent: Feb. 13, 2018

(54) METHOD FOR REHABILITATING A PIPE

(71) Applicant: SHONAN GOSEI-JUSHI SEISAKUSHO K.K., Kanagawa (JP)

(72) Inventors: Takao Kamiyama, Kanagawa (JP); Takeshi Hasegawa, Kanagawa (JP); Makoto Ishida, Kanagawa (JP)

(73) Assignee: SHONAN GOSEI-KUSHI SEISAKUSHO K.K. (JP)

( * ) Notice: Subject to any disclaimer, the term of this patent is extended or adjusted under 35 U.S.C. 154(b) by 0 days.

(21) Appl. No.: 15/207,866

(22) Filed: Jul. 12, 2016

(65) Prior Publication Data

US 2017/0016568 A1    Jan. 19, 2017

(30) Foreign Application Priority Data

Jul. 17, 2015   (JP) ................................ 2015-143259

(51) Int. Cl.

| | |
|---|---|
| *F16L 55/18* | (2006.01) |
| *F16L 55/165* | (2006.01) |
| *F16L 55/164* | (2006.01) |
| *F16L 1/036* | (2006.01) |
| *F16L 1/038* | (2006.01) |

(52) U.S. Cl.
CPC ........... *F16L 55/1657* (2013.01); *F16L 1/036* (2013.01); *F16L 1/038* (2013.01); *F16L 55/164* (2013.01); *F16L 55/165* (2013.01)

(58) Field of Classification Search
USPC ...................... 138/97, 98, 106, 112; 405/151
See application file for complete search history.

(56) References Cited

U.S. PATENT DOCUMENTS 1,075,842 A * 10/1913 McCutchen .......... E21B 33/134
                                                          138/178
3,585,270 A *  6/1971 Trump .................... H02G 5/066
                                                           174/13

(Continued)

FOREIGN PATENT DOCUMENTS

| EP | 1384937 | 1/2004 |
|---|---|---|
| JP | 7269742 | 10/1995 |
| JP | 2005265070 | 9/2005 |

OTHER PUBLICATIONS

Korean Office Action dated Dec. 6, 2016 in Korean Patent Application No. 10-2016-0088623 together with English-language translation.

(Continued)

*Primary Examiner* — James Hook
(74) *Attorney, Agent, or Firm* — Klintworth & Rozenblat IP LLP; Bruce L. Adams

(57) ABSTRACT

Segments are linked in the circumferential direction to assemble a pipe unit, which is linked to another pipe unit in the pipe-length direction to assemble a rehabilitation pipe inside an existing pipe. Before the pipe unit is assembled or after the pipe unit has been assembled, a spacer is attached to the segment using a spacer holder to prevent the spacer from falling down from the segment. The pipe unit having the spacer attached to the segment is linked to the pipe units that have already been linked. The rehabilitation pipe is positioned relative to the existing pipe using the spacer that is attached to the segment. A filler is injected between the positioned rehabilitation pipe and the existing pipe.

5 Claims, 16 Drawing Sheets

(56) References Cited

U.S. PATENT DOCUMENTS

| | | | | |
|---|---|---|---|---|
| 4,295,501 A | 10/1981 | Tolliver | ........................ | 140/92.1 |
| 7,165,578 B2* | 1/2007 | Kamiyama | ................ | E03F 3/06 |
| | | | | 138/98 |
| 7,278,613 B2* | 10/2007 | Roy | .......................... | F16L 3/02 |
| | | | | 138/106 |
| 7,451,783 B2* | 11/2008 | Kamiyama | ................ | F16L 7/00 |
| | | | | 138/112 |
| 2005/0236058 A1 | 10/2005 | Kamiyama et al. | ............. | 138/98 |
| 2016/0238183 A1* | 8/2016 | Kamiyama | ................ | E03F 3/06 |

OTHER PUBLICATIONS

European Search Report dated Nov. 21, 2016 in Application No. EP 16 17 6920.

* cited by examiner

METHOD FOR REHABILITATING A PIPE

BACKGROUND OF THE INVENTION

Field of the Invention

The present invention relates to a method for rehabilitating a pipe using segments each comprising an inner surface plate constituting an inner circumferential surface, and side plates and end plates provided upright on peripheral edges of the inner surface plate, wherein the inner surface plate, the side plates, and the end plates are formed integrally from a plastic material and the segments are linked in the circumferential direction and in the pipe-length direction to construct a rehabilitation pipe inside an existing pipe.

Description of the Related Art

In cases in which an existing pipe such as a large-diameter sewage pipe buried underground has deteriorated through aging, a pipe lining method has been proposed and practiced in which a lining is provided to the inner circumferential surface thereof to repair the pipe without excavating it from the ground. In this pipe lining method, the segments are linked in the circumferential direction to assemble pipe units, which are then linked in the pipe-length direction using a linking member to construct a rehabilitation pipe inside an existing pipe. After assembling a rehabilitation pipe inside the existing pipe, grout or another filler is injected into a space between the existing pipe and the rehabilitation pipe and hardened to construct a composite pipe.

When the filler is injected between the existing pipe and the rehabilitation pipe, the rehabilitation pipe floats on the filler because the rehabilitation pipe is made of a plastic material having a specific gravity lower than the filler. To prevent the rehabilitation pipe from floating, a spacer as disclosed in JP 2005-265070 A1 is inserted in a gap between the rehabilitation pipe and the existing pipe every time the rehabilitation pipe is assembled a predetermined length (for example, one meter). This ensures that the rehabilitation pipe is pressed downward and prevented from floating on the filler.

In such a method, the spacer is pushed with a tension between the rehabilitation pipe and the existing pipe, so that, if the spacer is inappropriately inserted, it falls down or deviates from an appropriate position, causing the rehabilitation pipe to be maladjusted. Installing the spacer appropriately at a plurality of locations disadvantageously increases work steps.

An object of the present invention is therefore to provide a method for rehabilitating an existing pipe being capable of preventing a position adjusting spacer from falling down or deviating from an appropriate position.

SUMMARY OF THE INVENTION

In a method for rehabilitating an existing pipe according to the present invention, segments are linked in the circumferential direction and in the pipe-length direction to assemble a rehabilitation pipe inside the existing pipe. The method comprises: linking the segments in the circumferential direction to assemble a pipe unit; attaching a spacer to the segment using a spacer holder before the pipe unit is assembled or after the pipe unit has been assembled; linking the pipe unit having the spacer attached to the segment to the already linked pipe units; positioning the rehabilitation pipe relative to the existing pipe using the spacer; and injecting a filler between the positioned rehabilitation pipe and the existing pipe.

According to the present invention, the spacer for adjusting the position of the rehabilitating pipe inside the existing pipe is attached to the segment using the spacer holder. This enables the spacer to be prevented from falling down from the segment or not to be displaced during rehabilitation work, so that the rehabilitation pipe can be positioned appropriately inside the existing pipe, ensuring that the filler can be injected between the existing pipe and the rehabilitation pipe.

DESCRIPTION OF THE PREFERRED EMBODIMENTS

The present invention will now be described with references to embodiments illustrated in the accompanying drawings. The present invention is suitable for rehabilitating or repairing sewage pipes, water supply pipes, tunnels, agricultural irrigation channels, and other existing large-diameter pipes. In the present embodiment, the rehabilitation pipes are described as having a circular cross-section profile orthogonal to the pipe-length direction. However, it shall be apparent that the present invention can be applied to a rehabilitation pipe having a square or another non-circular cross-section. Also, in addition to structures in which the cross-section profile is closed as a pipe, a structure having a horseshoe-shaped, semi-circular, U-shaped, or another cross-section profile in which one side is open can also be considered to be a pipe, and the present invention can also be applied thereto.

Figure 1:
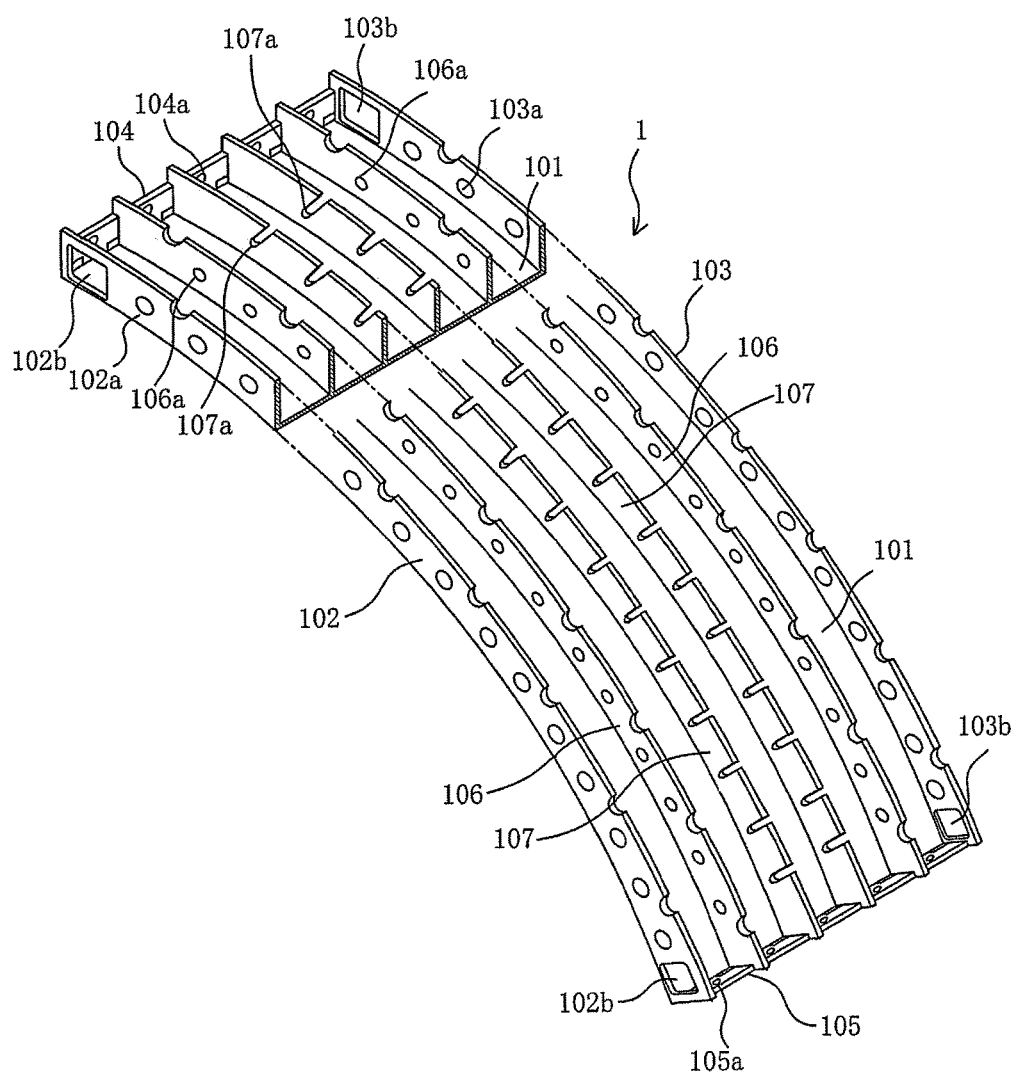
FIG. 1 is a perspective view showing the structure of a segment used in assembling the rehabilitation pipe.

FIG. 1 shows the structure of a segment 1 for pipe rehabilitation (hereafter simply referred to as "segment"). The segment 1 is an integrally formed block-shaped member made from a plastic material, comprising an inner surface plate 101 constituting an inner circumferential surface of the rehabilitation pipe, side plates 102, 103 provided vertically upright on both sides extending in the circumferential direction of the inner surface plate 101, and end plates 104, 105 provided vertically upright on both ends extending in the pipe-length direction of the inner surface plate 101.

In the present embodiment, the segment 1 has a shape that is curved as an arc representing a predetermined angle that equally divides the circumference, e.g., a 60° arc that divides the circumference into sixths. However, the segment is not limited to that having an arc or a fan shape.

A plurality of inner plates 106, 107 having a shape similar to that of the side plates are provided upright at equal intervals and parallel to the side plates 102, 103 in order to reinforce the mechanical strength of the segment 1. The side plates 102, 103 and the inner plates 106, 107 are all equal in thickness in the pipe-length direction.

A plurality of circular insertion holes 102a and 103a for admitting insertion of a liking member 11 and a nut 12 (FIG. 3) for linking the segment 1 in the pipe-length direction are provided at equal intervals along the circumference on the side plates 102 and 103. The inner plate 106 is also provided at equal intervals with circular insertion holes 106a for admitting insertion of the linking member for linking the segments in the pipe-length direction. The inner plate 107 is provided with a plurality of notches 107a to admit insertion of the linking member in the pipe-length direction. The insertion holes 102a, 103a and 106a, and the notches 107a are located at coinciding positions along the circumferential direction.

The side plates 102, 103 are provided at both ends in the circumferential direction with openings 102b and 103b that are used for a linking operation of the segments in the circumferential direction.

The end plates 104 and 105 are disposed between the side plate 102 and the side plate 103 and are provided with circular insertion holes 104a, 105a for admitting insertion of a bolt or another linking member for linking the segments in the circumferential direction.

The inner surface plate 101, the side plates 102, 103, the end plates 104, 105, and the inner plates 106, 107 are all made from an identical transparent, semi-transparent or opaque plastic material, and are integrally formed using a known molding technique.

The end plate 105 of one segment is aligned with the end plate 104 of another segment, and a bolt 6 and a nut 7 (FIG. 3) are inserted into the openings 102b, 103b on the side plates 102, 103 to link the segments in the circumferential direction.

Figure 2:
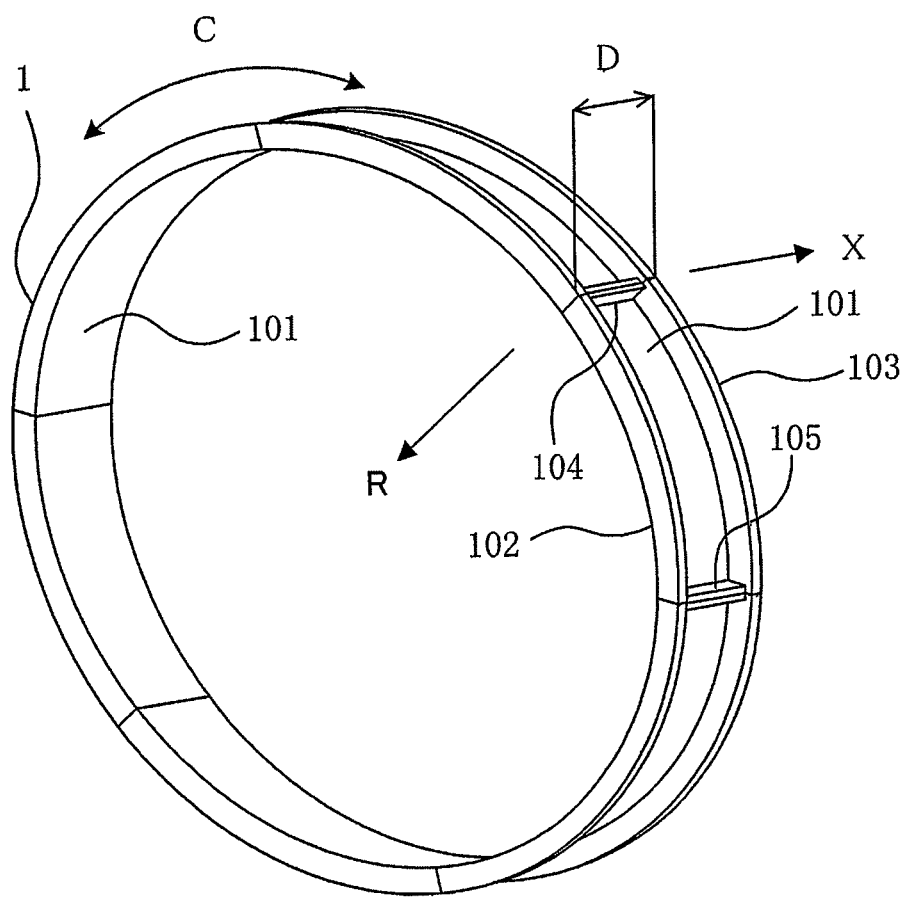
FIG. 2 is a perspective view showing a state in which the segments are linked in the circumferential direction to assemble a pipe unit.

As shown in FIG. 2, the segments 1 are sequentially linked around the full circumference to assemble a ring-shaped pipe unit 10. The pipe unit 10 has a shape that can be obtained when a circular pipe is sliced at a predetermined width D perpendicularly to the pipe-length direction X. The outside diameter of the pipe unit 10 is slightly smaller than the inside diameter of the existing pipe to be rehabilitated. The segment 1 corresponds to a member obtained by dividing the pipe unit 10 into a plurality of (preferably equal) portions along a cutting surface parallel to the radial direction R.

In FIG. 2, the inner surface plate 101, the side plates 102, 103, and the end plates 104, 105, which are the principal structural members of the segment 1, are shown. In order to prevent the drawing from becoming complicated, the inner plates 106, 107 and other reinforcement structures are not shown.

Figure 3:
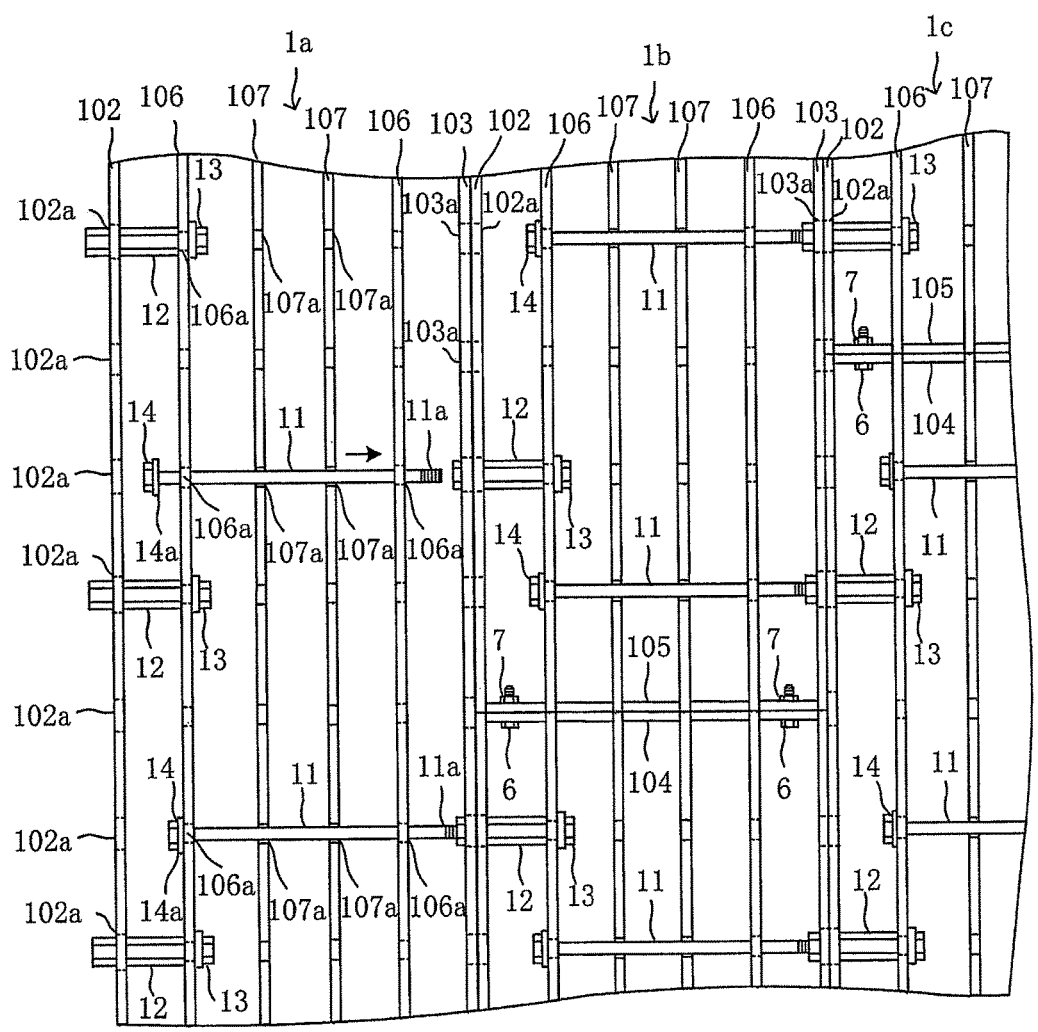
FIG. 3 is an illustrative view showing a state in which the segments of the pipe units are linked in the pipe-length direction using linking members.

The pipe units 10 are sequentially linked in the pipe-length direction using a linking member 11 and a nut 12 as shown in FIG. 3.

To link the segments in the pipe-length direction, the nuts 12 are fixed to one of the side plates of the segment using a bolt 13. The length of the nut 12 in the pipe-length direction is slightly greater than the spacing between the side plate 102 and the inner plate 106, and the nut 12 protrudes outwards from the side plate 103 of another segment 1a with the amount of protrusion equivalent to or greater than the thickness thereof. The linking member 11 is configured as a metallic bolt, having at one end a section 11a threaded into the nut 12b and at the other end a head 14 having a flange section 14a.

To link the segment 1a to the segment 1b, the nut 12 that protrudes from the side plate 102 of the segment 1b is, as shown in FIG. 3, inserted through the insertion hole 103a in the side plate 103 of the segment 1a in order to place the side plates 103, 102 of the segments 1a, 1b against each other. The linking member 11 is then passed through the insertion hole 102a in the side plate 102, the insertion holes 106a of the inner plate 106, and the notches 107a of the inner plate 107 of the segment 1a, and a threaded section 11a thereof is threaded into the nut 12 that is fixed to the segment 1b. This causes the linking member 11 to be coupled to the nut 12.

The linking member 11 is further threaded into the nut 12 until a flange section 14a of the head 14 presses against the leftmost inner plate 106 of the segment 1a to tighten and fix the two segments 1a, 1b. The segments of the pipe units are thus linked in the pipe-length direction to a desired length.

Figure 4:
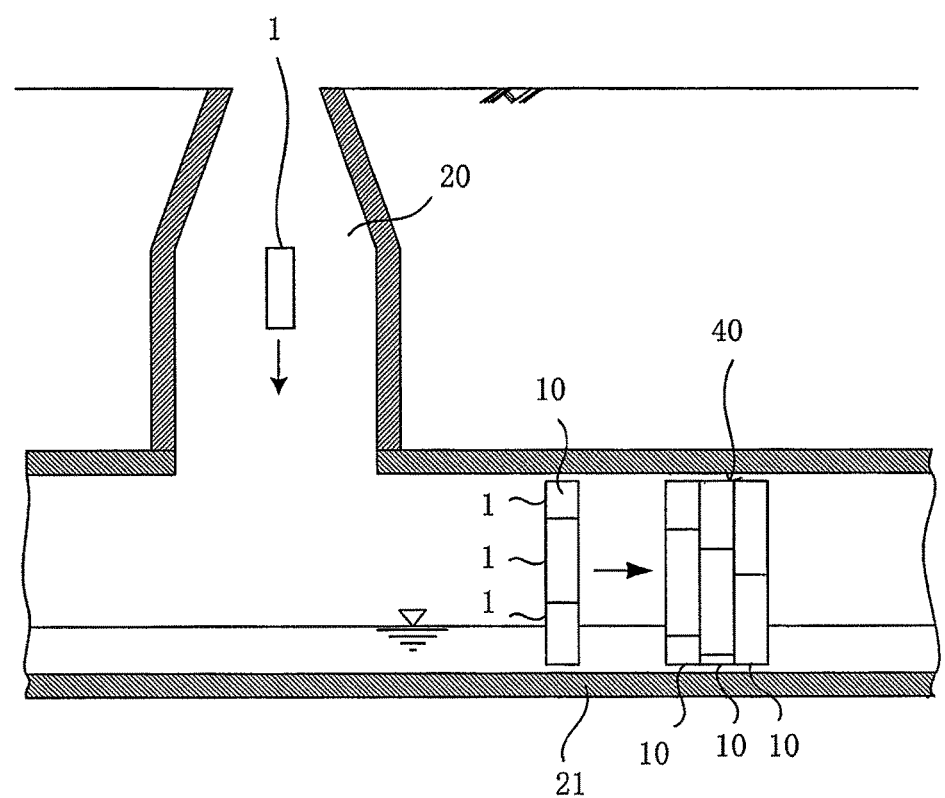
FIG. 4 is an illustrative view showing a state in which a rehabilitation pipe is installed inside an existing pipe.
Figure 5:
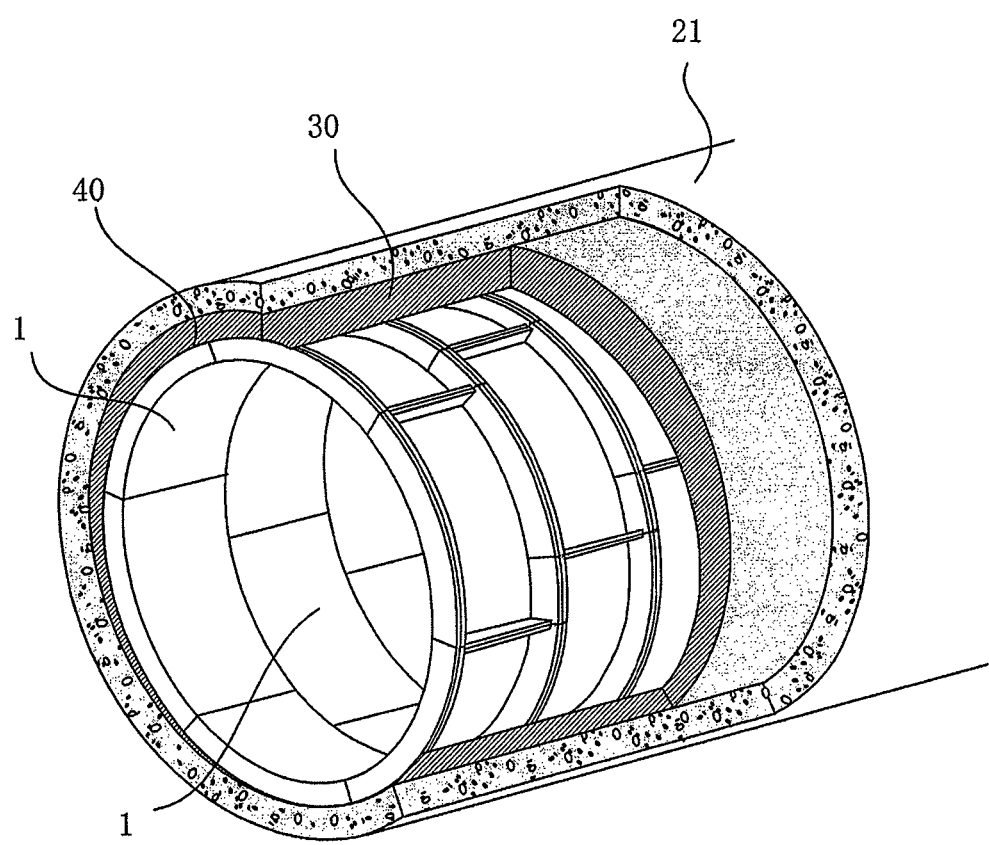
FIG. 5 is a perspective view showing the rehabilitation pipe installed inside the existing pipe.

As shown in FIG. 4, the segment 1 is first carried through a manhole 20 into an existing pipe 21, and as shown in FIG. 2, the segments 1 are sequentially linked in the circumferential direction to assemble the pipe unit 10. The pipe units 10 are then sequentially linked in the pipe-length direction using the linking member 11 and the nut 12, as shown in FIG. 3, thus installing a rehabilitation pipe 40 in the existing pipe 21. A filler 30 such as grout material is then injected into a space between the rehabilitation pipe 40 and the existing pipe 21. Once the filler 30 hardens, a composite pipe is provided which comprises the rehabilitation pipe 40, the existing pipe 21 and the filler 30, as shown in FIG. 5.

Figure 6:
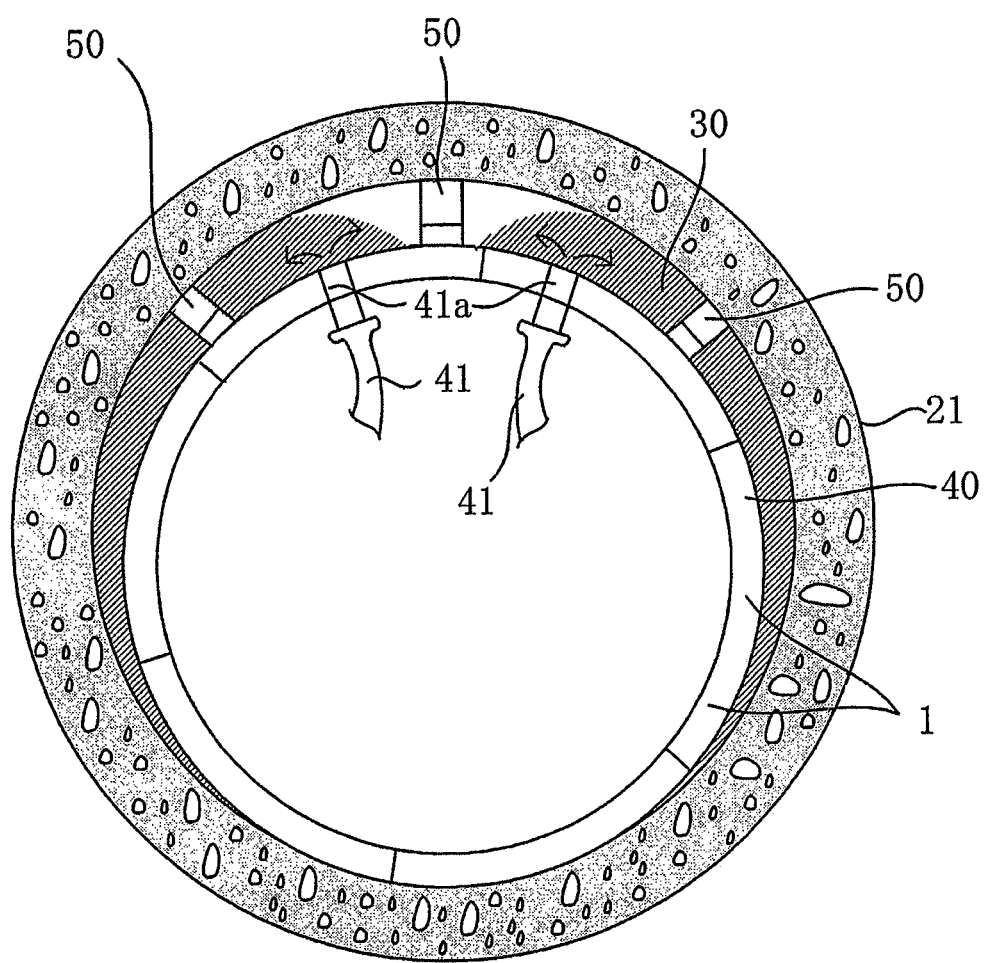
FIG. 6 is a cross-sectional view showing a state in which a filler is injected into the gap between the rehabilitation pipe and the existing pipe.

In such a rehabilitation work, an injection hole 41a is, as shown in FIG. 6, formed in the segment 1 after the rehabilitation pipe 40 is installed inside the existing pipe 21, and the filler 30 is injected through the injection hole 41a into the space between the rehabilitation pipe 40 and the existing pipe 21. In this step, a spacer 50 is inserted between the rehabilitation pipe 40 and the existing pipe 21 to adjust the position of the rehabilitation pipe 40.

Figure 7A:
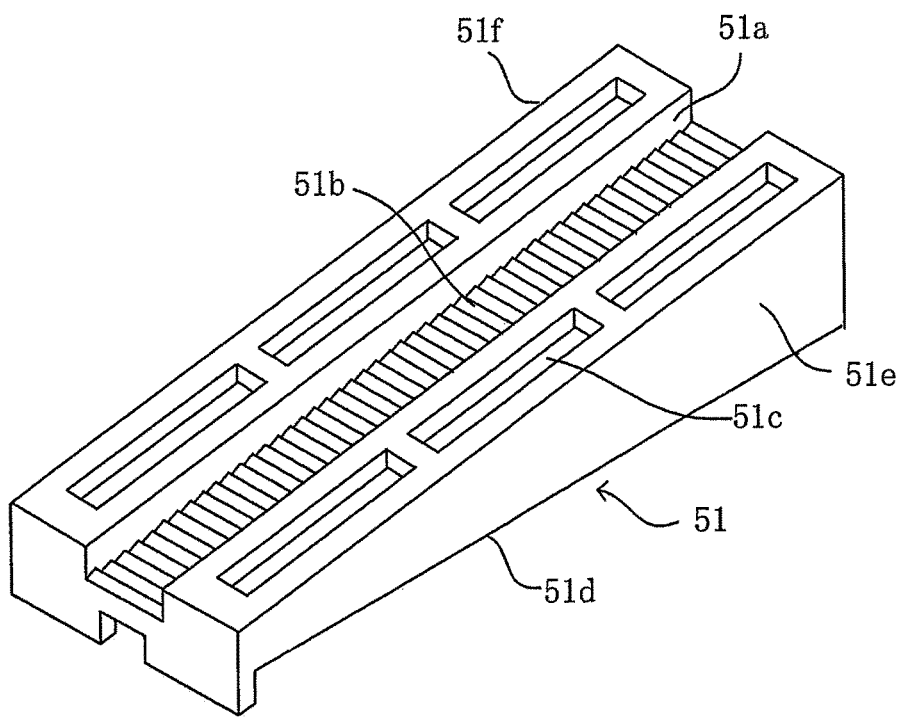
FIG. 7a is a perspective view showing the structure of a first wedge-shaped member that constitutes a spacer.
Figure 7B:
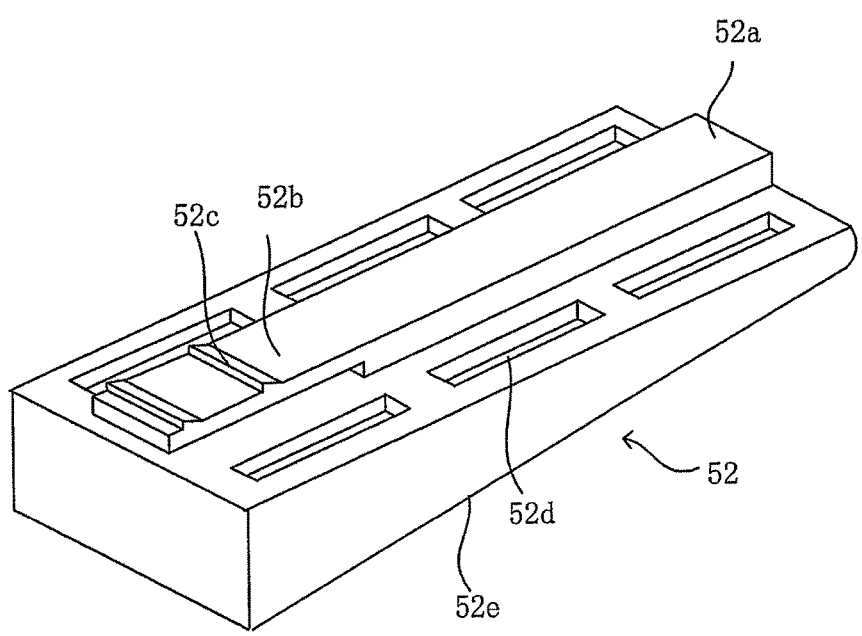
FIG. 7b is a perspective view showing the lower surface side of a second wedge-shaped member that constitutes the spacer.
Figure 8A:
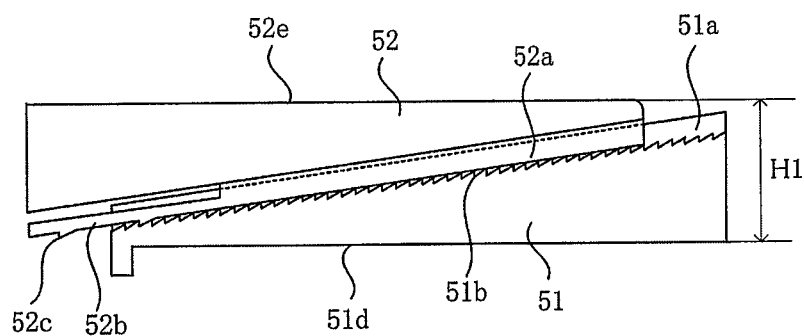
FIG. 8a is an illustrative view showing the spacer with the second wedge-shaped member overlapped on the first wedge-shaped member.
Figure 8B:
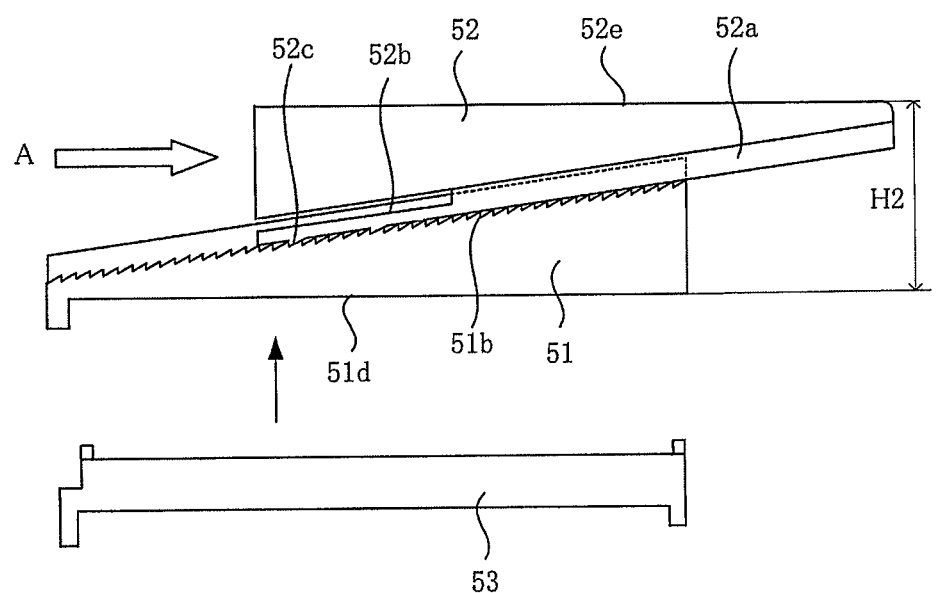
FIG. 8b is an illustrative view showing that the second wedge-shaped member is moved relative to the first wedge-shaped member to increase the overall height of the spacer.

The spacer 50 comprises a first wedge-shaped member 51 whose upper surface is shown in FIG. 7a, and a second wedge-shaped member 52 whose lower surface is shown in FIG. 7b, and both the wedge-shaped members 51, 52 are overlapped, as shown in FIG. 8a. If the height of the spacer 50 is insufficient, a raising member 53 as shown in FIG. 8b is used to increase the height of the spacer 50.

The spacer 50 is similar to that disclosed in JP 2005-265070 A1. The first wedge-shaped member 51 has a guide groove 51*a* at the center part, and numerous serrated latching teeth 51*b* are formed on the bottom surface thereof in the inclined direction at a predetermined pitch as small as several millimeters. The first wedge-shaped member 51 has further six long holes 51*c* formed between the guide groove 51*a* and walls 51*e*, 51*f* on both sides.

The second wedge-shaped member 52 has at the center part a protruding part 52*a* that fits into the guide groove 51*a* of the first wedge-shaped member 51. The protruding part 52*a* is formed thinner at one end, forming an elastic deformable member 52*b*. The elastic deformable member 52*b* is provided at the lower surface thereof with a plurality of latching teeth 52*c* (two in FIG. 7*b*) at integer multiples of the pitch (10-20 millimeters) of the latching teeth 51*b* of the first wedge-shaped member 51. The latching teeth 51*b* and 52*c* are serrated so as to have inclined and vertical surfaces, thus forming a one-way clutch such that the first and second wedge-shaped members 51 and 52 are movable when they engage at the inclined surfaces, while immovable when they engage at the vertical surfaces. The second wedge-shaped member 52 further has between the protruding part 52*a* and walls on both sides six long holes 52*d* that align with the long holes 51*c* of the first wedge-shaped member 51.

The first and second wedge-shaped members 51 and 52 are inversely inclined with the same angle. When both the first and second wedge-shaped members 51, 52 overlap with the protruding part 52*a* of the second wedge-shaped member 52 being fitted to the guide groove 51*a* of the first wedge-shaped member 51, the upper surface 52*e* of the second wedge-shaped member 52 is parallel to the lower surface 51*d* of the first wedge-shaped member 51, as shown in FIGS. 8*a* and 8*b*.

When the second wedge-shaped member 52 is pressed in the direction A, the latching teeth 51*b* and 52*c* engage at the inclined surfaces, enabling the second wedge-shaped member 52 to move relative to the first wedge-shaped member 51. However, it is not movable in the opposite direction because both the latching teeth 51*b* and 52*c* engage at the vertical surfaces. By successively moving the second wedge-shaped member 52 in the direction A, the overall height of the first and second wedge-shaped Members 51 and 52 can be set stepwise from H1 to H2 to a desired height at a small pitch. The elastic deformable member 52*b* of the wedge-shaped member 52 is elastically deformable, so that, when it is lifted upwards by hand or tools, both the latching teeth 51*b* and 52*c* disengage and the second wedge-shaped member 52 can be moved in the direction opposite the direction A.

If the spacer 50 is inappropriately inserted, or it deviate from an appropriate position, it is likely to fall down from the segment, or deviate therefrom, resulting in maladjustment of the rehabilitation pipe. To avoid this, the present embodiment provides a spacer holder 60 as shown in FIG. 9, in which FIGS. 9*a*-9*e* are respectively a perspective view, a top view, a front view, a bottom view and a side view of the space holder 60.

The space holder 60 is configured to hold the spacer so as not to fall down from the segment, and is a rectangular block-shaped member, having surfaces 60*a* and 60*b* in the pipe-length direction (longitudinal direction) and having at the center part a groove 60*c* that extends with a width t1 all over the length in the circumferential direction (in the left and right direction). The width t1 of the groove 60*c* is set so as to be equal to the plate thickness of the side plates 102, 103 and the inner plates 106, 107 of the segment 1. Such a setting enables, for example, the inner plate 107 to be pressed into the groove 60*c* of the space holder 60. This allows the space holder 60 to be mounted in the inner plate 107. For easy pressing, the space holder 60 is provided with an inclined surface at the end at which it is pressed.

Figure 9A:
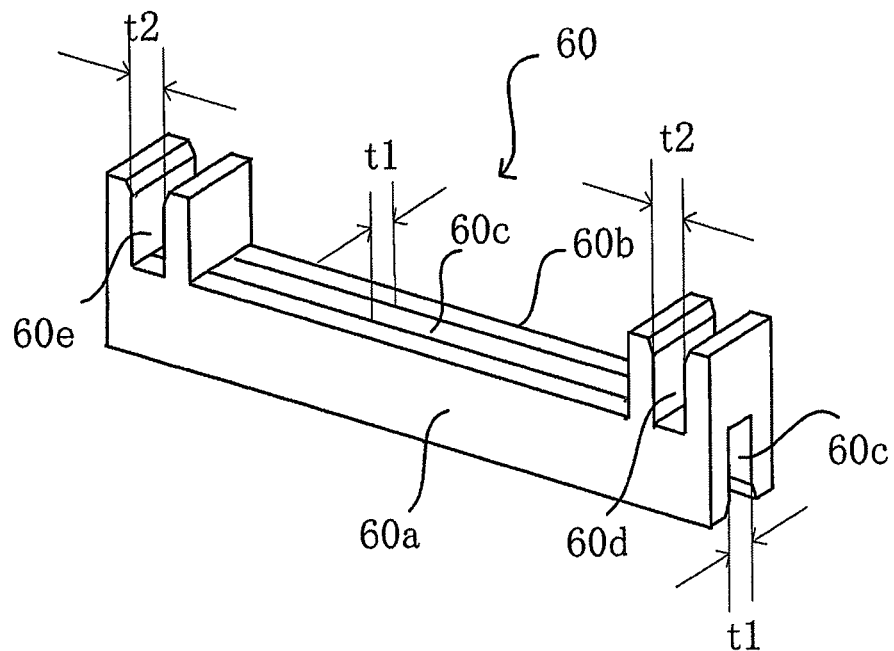
FIG. 9a is a perspective view showing a spacer holder.
Figure 9B:
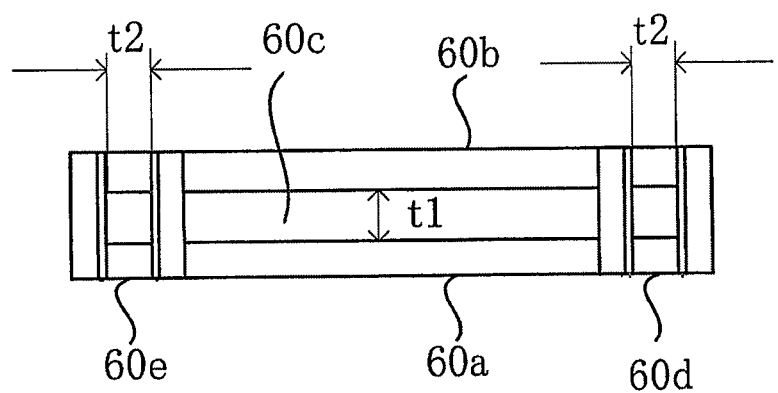
FIG. 9b is a top view showing the spacer holder.
Figure 9C:
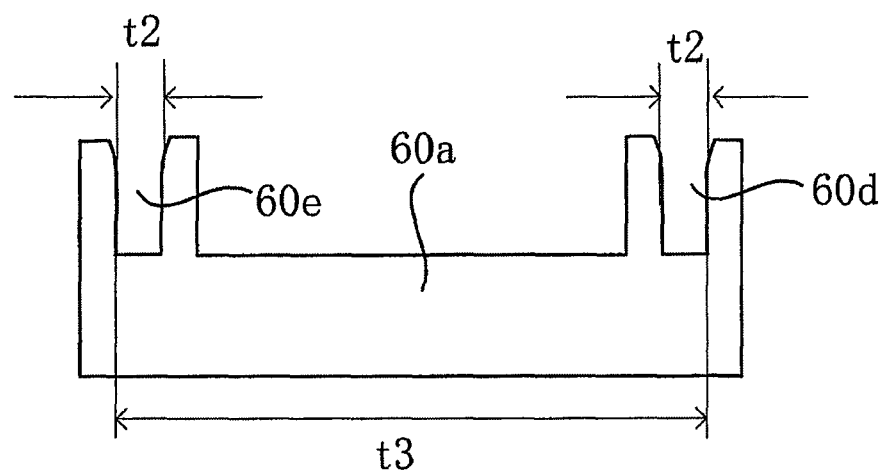
FIG. 9c is a front view showing the spacer holder.
Figure 9D:
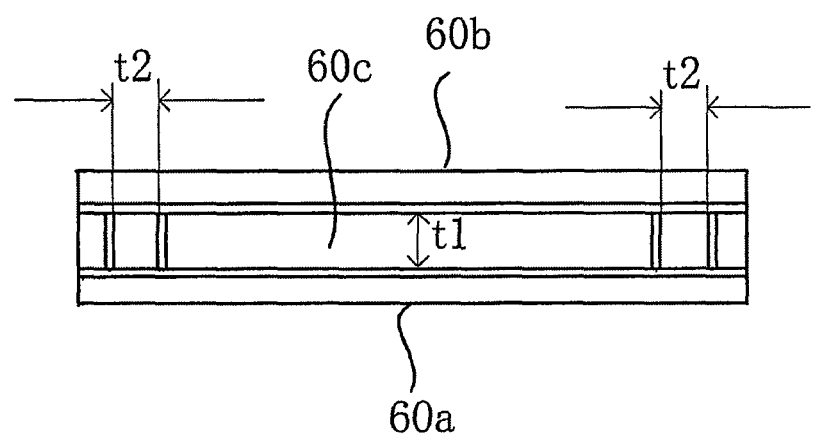
FIG. 9d is a bottom view showing the spacer holder.
Figure 9E:
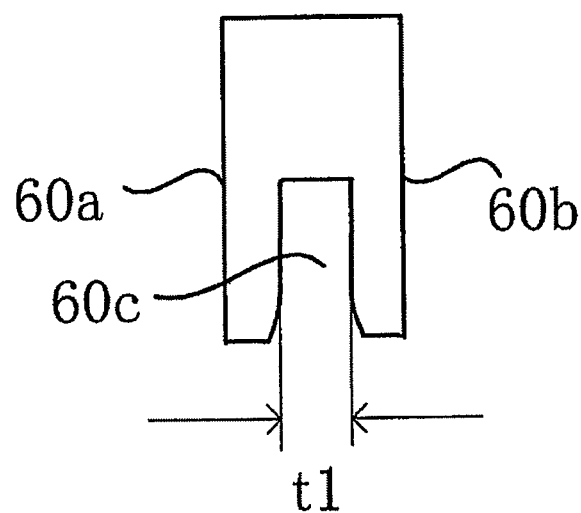
FIG. 9e is a side view showing the spacer holder.
Figure 10:
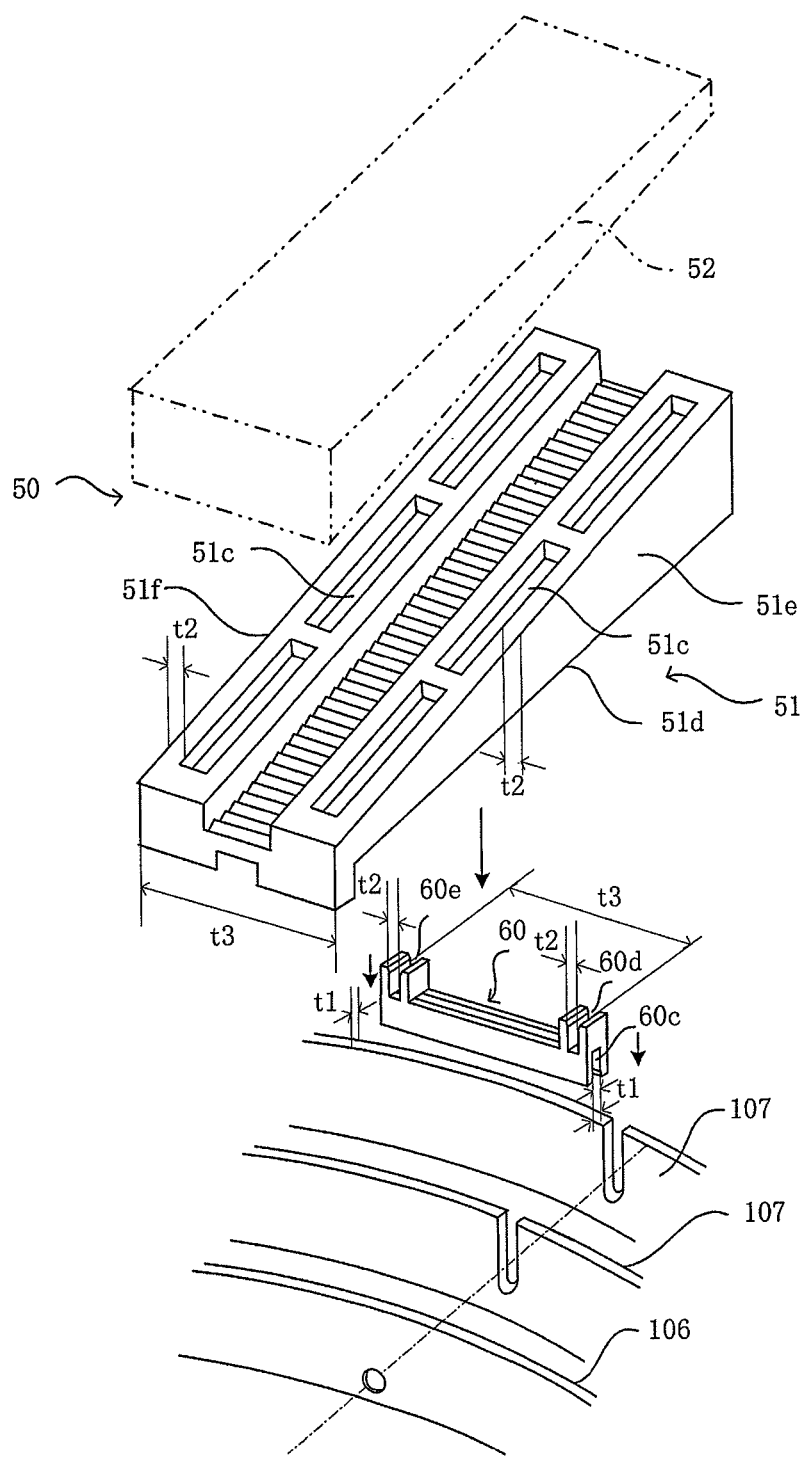
FIG. 10 is an illustrative view showing a state in which the spacer is attached to the segment using the spacer holder.
Figure 12:
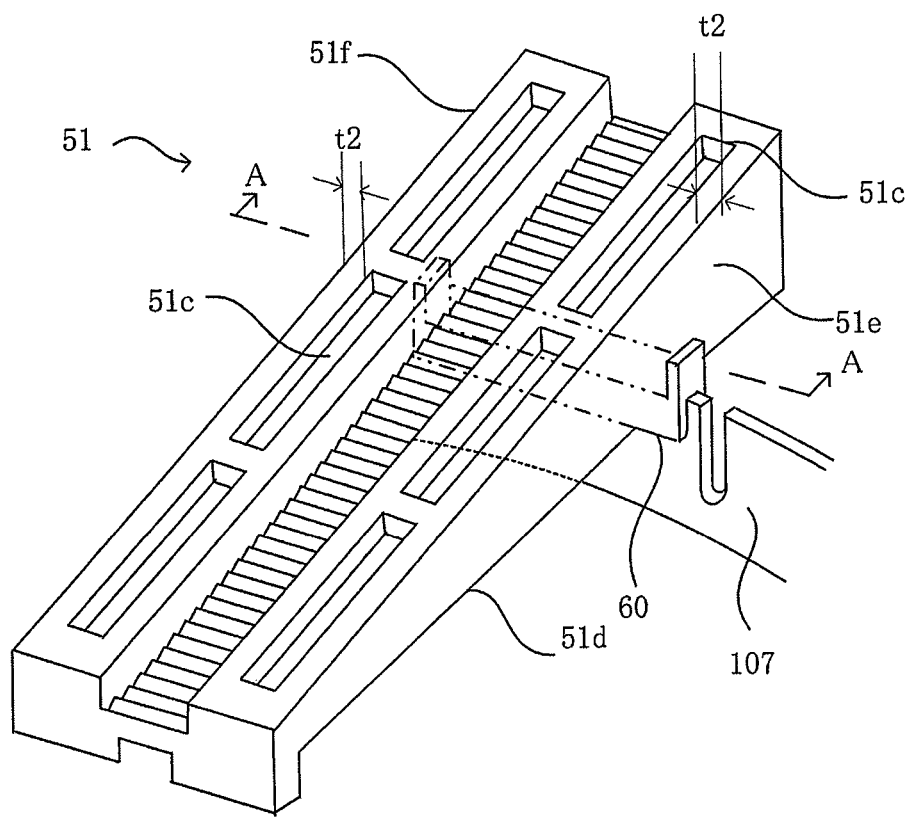
FIG. 12 is a perspective view of the spacer that is attached to the segment via the spacer holder.
Figure 13:
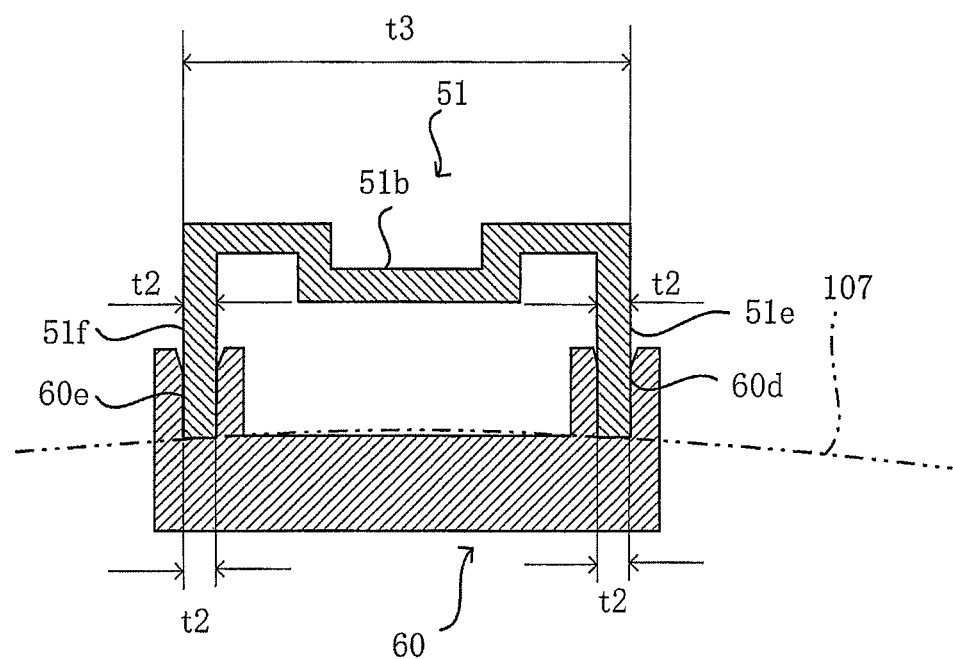
FIG. 13 is a cross-sectional view along A-A in FIG. 12.

The space holder 60 further has at both ends in the circumferential direction thereof grooves 60*d* and 60*e* each having a width t2, which is set to be equal to the wall thickness of the walls 51*e*, 51*f* of the first wedge-shaped member 51. The distance t3 between the outer surfaces of the grooves 60*d*, 60*e* of the space holder 60 is set to be equal to the circumferential width of the first wedge-shaped member 51 of the spacer 50. Such a setting enables the first wedge-shaped member 51 to be pressed into the grooves 60*d*, 60*e* of the space holder 60, as shown in FIGS. 12 and 13. For easy pressing, the space holders 60 are provided with inclined surfaces at the end at which it is pressed as shown in FIG. 9*e*.

Figure 11:
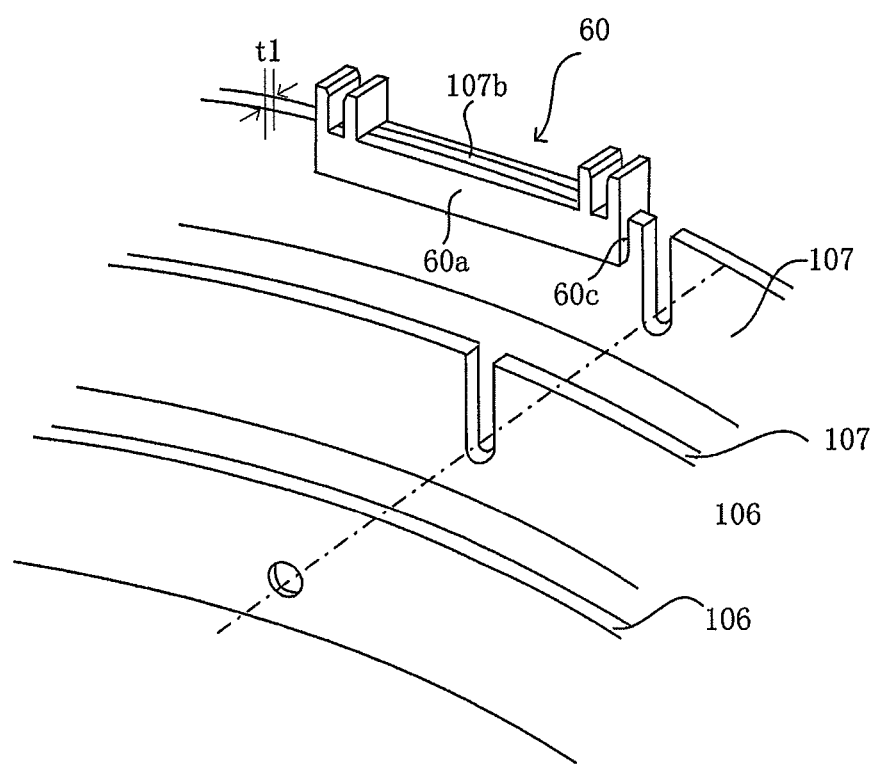
FIG. 11 is a perspective view of the spacer holder mounted in the segment.

In such an arrangement, before or after the pipe unit 10 is assembled, the spacer holder 60 is, as shown in FIG. 11, mounted in, for example, the inner plate 107 by pressing the inner plate 107 into the groove 60*c* of the space holder 60. Since the inner plate 107 is curved, the curved surface 107*b* thereof protrudes upwards slightly from the groove 60*c* when the space holder 60 is mounted therein.

Mounted in the inner plates 107 are many space holders 60 the number of which depends on the number of the spacers 50 used. The space holder 60 may be mounted in another inner plate 107, the inner plate 106 or the side plate 102.

Figure 14:
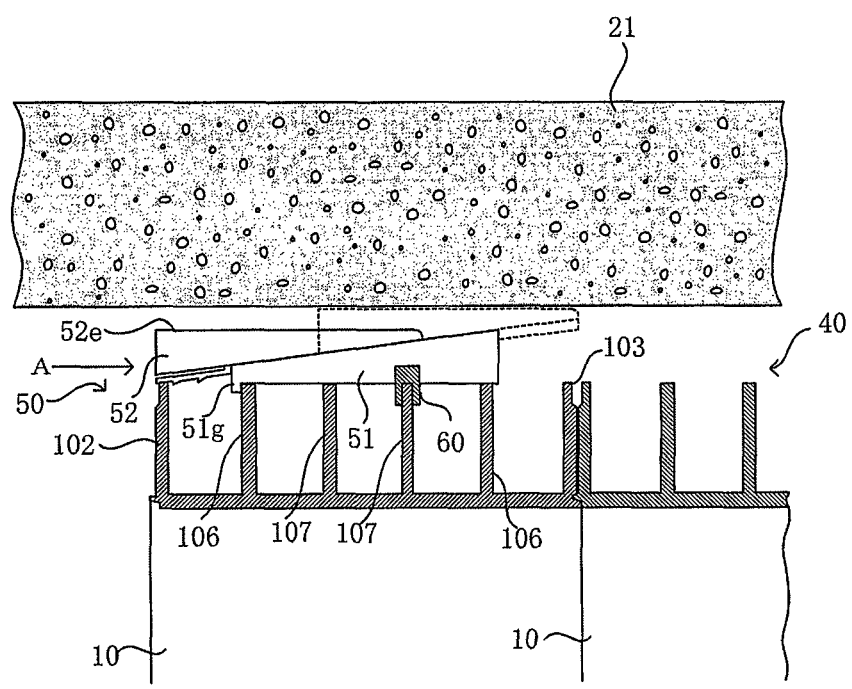
FIG. 14 is an illustrative view showing a state in which the position of the rehabilitation pipe is adjusted by the spacer.

After the space holder 60 is mounted in the inner plate 107, the first wedge-shaped member 51 is, as shown in FIG. 12, held by the space holder 60 by pressing the side walls 51*e*, 51*f* of the first wedge-shaped member 51 into the grooves 60*d*, 60*e* of the space holder 60. As shown in FIG. 14, the first wedge-shaped member 51 is attached to the segment so that the protrusion 51*g* of the first wedge-shaped member 51 that protrudes downwards may engage with the outer surface of the inner plate 106.

The first wedge-shaped member 51 is held by the spacer holder 60 and attached to the segment before the pipe unit 10 is assembled, or after the pipe unit 10 has been assembled. Every time the pipe units are linked in the pipe-length direction a predetermined length (for example, one meter), the pipe unit 10 to which the first wedge-shaped member 51 and the space holder 60 are attached is disposed so that the first wedge-shaped member 51 is positioned above, as shown in FIG. 14, and it is linked to the pipe units that are already linked in the pipe-length direction.

The second wedge-shaped member 52 is engaged at the protruding part 52*a* with the groove 51*a* of the first wedge-shaped member 51, and is pressed in the direction A. This causes the spacer 50 to increase in height to bring the upper surface 52*e* of the second wedge-shaped member 52 against the inner surface of the existing pipe 21. The rehabilitation pipe 40 then receives a reaction force and is pressed downwards into contact with the bottom of the existing pipe 21.

The positional adjustment using the spacer is performed at approximately every one meter for a plurality of pipe units 10. When the laying and position adjustment for the overall length of the rehabilitation pipe 40 is completed, all the pipe units 10 are brought into contact with the bottom of the existing pipe 21.

In the present embodiment, the first wedge-shaped member 51 is held directly by the space holder 60. However, if both the wedge-shaped members 51, 52 can be engaged so that the second wedge-shaped member 52 may not remove from the first wedge-shaped member 51, the spacer holder 60 can hold both the wedge-shaped members 51 and 52. Thus, the spacer that is held by the space holder 60 means a part of the spacer (i.e., the first wedge-shaped member 51) or the whole thereof (i.e., the first and second wedge-shaped members 51, 52).

When all the pipe units 10 are linked so long as desired in the pipe-length direction, the injection holes 41a are formed, as shown in FIG. 6, and the filler 30 is injected through the injection holes 41a using injection hoses 41 into the space between the existing pipe 21 and the rehabilitation pipe 40. Since the rehabilitation pipe 40 is pressed downwards by the spacer 50 and brought into contact with the bottom of the existing pipe 21, the rehabilitation pipe 40 is appropriately positioned inside the existing pipe 21 and doesn't float on the injected filler 30. Once the filler 30 hardens, a composite pipe is created that comprises the existing pipe 21, the rehabilitation pipe 40 and the filler 30.

In the above-described embodiment, the spacer holder is first mounted in the segment and the spacer is then held by the space holder. However, the spacer is first held by the spacer holder, and the spacer holder that holds the spacer may be mounted in the segment.

The spacer can thus be attached to the segment using the spacer holder. This enables the spacer to be prevented from falling down from the segment or not to be displaced during rehabilitation work, so that the rehabilitation pipe can be positioned appropriately inside the existing pipe, ensuring that the filler can be injected between the existing pipe and the rehabilitation pipe.

What is claimed is:

1. A method for rehabilitating an existing pipe, in which segments are linked in the circumferential direction and in the pipe-length direction to assemble a rehabilitation pipe inside the existing pipe, the method comprising:
    providing a plurality of segments each comprising an inner surface plate, side plates extending vertically upright on opposite sides of the inner surface plate and extending in the circumferential direction of the inner surface plate, and a plurality of inner plates extended vertically upright on the inner surface plate between the side plates;
    linking the segments in the circumferential direction to assemble a pipe unit;
    attaching a spacer to one of the segments using a spacer holder before the pipe unit is assembled or after the pipe unit has been assembled, the attaching a spacer to one of the segments using a spacer holder comprising pressing one inner plate of the one segment into a groove on the spacer holder to attach the spacer holder to the one segment, and pressing opposed side walls of the spacer into respective grooves on the spacer holder to attach the spacer to the spacer holder;
    linking the pipe unit having the spacer attached to the segment in the pipe-length direction to already linked pipe units to form a rehabilitation pipe;
    positioning the rehabilitation pipe relative to the existing pipe using the spacer; and
    injecting a filler between the positioned rehabilitation pipe and the existing pipe.

2. A method for rehabilitating an existing pipe according to claim 1, wherein the spacer holder is first attached to the one segment and the spacer is then attached to the spacer holder.

3. A method for rehabilitating an existing pipe according to claim 1, wherein the spacer is first attached to the spacer holder and the spacer holder that holds the sparer is attached to the one segment.

4. A method for rehabilitating an existing pipe according to claim 1, wherein the groove on the spacer holder extends in the circumferential direction and has the same width as the plate thickness of the inner plate.

5. A method for rehabilitating an existing pipe according to claim 1, wherein the side walls of the spacer extend in the pipe-length direction, and the grooves on the spacer holder each have the same width as the thickness of the side wall of the spacer.

\* \* \* \* \*